(12) United States Patent
Gao et al.

(10) Patent No.: US 11,648,682 B2
(45) Date of Patent: May 16, 2023

(54) HYBRID VISUAL SERVOING METHOD BASED ON FUSION OF DISTANCE SPACE AND IMAGE FEATURE SPACE

(71) Applicant: Harbin Institute of Technology, Heilongjiang (CN)

(72) Inventors: Huijun Gao, Heilongjiang (CN); Weiyang Lin, Heilongjiang (CN); Chenlu Liu, Heilongjiang (CN); Hao Guo, Heilongjiang (CN); Xinghu Yu, Heilongjiang (CN); Mingsi Tong, Heilongjiang (CN)

(73) Assignee: Harbin Institute of Technology, Heilongjiang (CN)

( * ) Notice: Subject to any disclaimer, the term of this patent is extended or adjusted under 35 U.S.C. 154(b) by 249 days.

(21) Appl. No.: 17/150,287

(22) Filed: Jan. 15, 2021

(65) Prior Publication Data

US 2021/0252700 A1 Aug. 19, 2021

(30) Foreign Application Priority Data

Feb. 18, 2020 (CN) .......................... 202010099117.5

(51) Int. Cl.
| | | |
|---|---|---|
| *B25J 9/16* | (2006.01) | |
| *G06V 10/48* | (2022.01) | |
| *G06F 18/25* | (2023.01) | |
| *G06F 18/213* | (2023.01) | |
| *G06V 10/77* | (2022.01) | |
| *G06V 10/80* | (2022.01) | |
| *G06V 10/44* | (2022.01) | |

(52) U.S. Cl.
CPC .......... *B25J 9/1697* (2013.01); *B25J 9/1607* (2013.01); *B25J 9/1664* (2013.01); *G06F 18/213* (2023.01); *G06F 18/25* (2023.01); *G06V 10/44* (2022.01); *G06V 10/48* (2022.01); *G06V 10/7715* (2022.01); *G06V 10/80* (2022.01); *G06V 10/803* (2022.01)

(58) Field of Classification Search
CPC ...... B25J 9/1607; B25J 9/1664; B25J 9/1697; G01C 21/1656; G06T 7/20; G06F 18/213; G06F 18/25; G06F 18/251; G06V 10/44; G06V 10/48; G06V 10/7715; G06V 10/80; G06V 10/803
See application file for complete search history.

(56) References Cited

FOREIGN PATENT DOCUMENTS

GB 2521429 A * 6/2015 ........... G06T 1/0014

* cited by examiner

*Primary Examiner* — Spencer D Patton
(74) *Attorney, Agent, or Firm* — Hickman Becker Bingham Ledesma LLP (57) ABSTRACT

The present disclosure relates to a visual servoing method based on fusion of distance space and image feature space. The method includes: constructing an image Jacobian matrix; constructing a depth Jacobian matrix; fusing the image Jacobian matrix and the depth Jacobian matrix, to obtain a hybrid visual servoing Jacobian matrix; and obtaining a robot motion control amount according to the hybrid visual servoing Jacobian matrix by using a control algorithm, to enable a robot to move to a target position, to complete precise positioning.

9 Claims, 5 Drawing Sheets

HYBRID VISUAL SERVOING METHOD BASED ON FUSION OF DISTANCE SPACE AND IMAGE FEATURE SPACE

RELATED APPLICATION

This application claims priority under 35 U.S.C. 119(a)-(d) to Foreign Application No. 202010099117.5 entitled "HYBRID VISUAL SERVOING METHOD BASED ON FUSION OF DISTANCE SPACE AND IMAGE FEATURE SPACE" and filed in China on Feb. 18, 2020, the contents of which are herein incorporated in their entirety by reference for all purposes.

TECHNICAL FIELD

The present disclosure relates to the technical field of visual servoing, and in particular, to a hybrid visual servoing method based on fusion of distance space and image feature space.

BACKGROUND

A visual servoing technology is one of research hotspots in the intelligent robot development field and has been widely used in industry. To enable a robot to complete more complex work, the robot needs to have a control system with good performance and a capability of sensing complex environment changes.

In a conventional control method, control precision of position-based visual servoing (PBVS) depends on calibration results of a model and a camera, there is relatively poor robustness, and calibration needs to be usually performed. Compared with the PBVS, image-based visual servoing (IBVS) is more robust in terms of a model parameter and image noise. In a control method based on development of IBVS, two-dimensional image feature information is obtained by using a visual sensor in most algorithms, and then the obtained image information is used to complete servoing control. For a servoing task in three-dimensional space, information about an end posture of a robot is lacked. Consequently, an environment cannot be comprehensively perceived, and a servoing effect cannot be further improved.

To enable the robot to perceive the environment more comprehensively, to compensate for information collected by a visual system of the robot, a plurality of sensors can be added to the visual system of the robot, to overcome deficiency in the visual system of the robot. Nowadays, a distance measurement sensor with high precision has been developed rapidly, to provide a new environmental detection scheme. The distance measurement sensor and the camera are fused, so that high-precision positioning can be provided for a position and posture of a target object. However, problems of information fusion and redundancy of the system need to be solved due to the plurality of sensors.

For the above background and problems, a new visual servoing method would be helpful. A distance measurement sensor and a visual sensor are combined, to implement mutual supplement of distance space information and image feature space information, and resolve problems of multi-information fusion and information redundancy, so that a robot can perceive an environment change comprehensively, realize precise positioning of a target object, and complete a servoing task.

SUMMARY

The present application discloses a hybrid visual servoing method and related techniques based on fusion of distance space and image feature space, to resolve problems of multi-information fusion and information redundancy, so that a robot can perceive an environment change comprehensively, realize precise positioning of a target object, and complete a servoing task.

In some embodiments, a visual servoing method based on fusion of distance space and image feature space includes:
  constructing an image Jacobian matrix;
  constructing a depth Jacobian matrix;
  fusing the image Jacobian matrix and the depth Jacobian matrix, to obtain a hybrid visual servoing Jacobian matrix; and
  obtaining a robot motion control amount according to the hybrid visual servoing Jacobian matrix by using a control algorithm, to enable a robot to move to a target position, to complete precise positioning.

Optionally, the constructing an image Jacobian matrix specifically includes:
  obtaining a target image;
  converting the target image into a grayscale image, and performing binarization processing, to obtain a binary image;
  performing mean filtering on the binary image, and performing edge detection on the filtered binary image, to obtain an edge-detected image;
  detecting the edge-detected image by using a Hough line detection algorithm, to obtain two longest straight lines that are intersected; and restoring the two straight lines to the target image, to obtain an intersection point of the two straight lines, where two coordinate points of one straight line are $(a_x,a_y),(b_x,b_y)$, two coordinate points of the other straight line are $(c_x,c_y),(d_x,d_y)$ and the intersection point is represented by $O(u,v)$;
  determining a desired posture deflection angle of an end of the robot relative to a target object according to the intersection point and a point on one straight line, where the deflection angle is represented by $\theta$; and
  determining the image Jacobian matrix according to the intersection point and the deflection angle.

Optionally, the constructing a depth Jacobian matrix specifically includes:
  determining a position vector of an intersection point of the $i^{th}$ sensor and a measured plane in an apparatus coordinate system;
  determining a normal vector of the measured plane according to the position vector of the intersection point of the $i^{th}$ sensor and the measured plane in the apparatus coordinate system; and
  determining the depth Jacobian matrix according to the normal vector.

Optionally, the obtaining a robot motion control amount according to the hybrid visual servoing Jacobian matrix by using a control algorithm, to enable a robot to move to a target position, to complete precise positioning specifically includes:
  determining an error value of a visual servoing system;
  determining an end velocity of the robot according to the error value; and
  enabling the robot to move to the target position according to the end velocity of the robot, to complete precise positioning.

Optionally, the determining a desired posture deflection angle of an end of the robot relative to a target object according to the intersection point and a point on one straight line is specifically expressed as:

$$\theta = a\tan\left(\frac{a_x - u}{a_y - v}\right).$$

Optionally, the determining the image Jacobian matrix according to the intersection point and the deflection angle is specifically expressed as:

$$\begin{bmatrix} \dot{u} \\ \dot{v} \\ \dot{\theta} \end{bmatrix} = J_1 V = \begin{bmatrix} -\frac{\lambda}{z} & 0 & \frac{u}{z} & \frac{uv}{\lambda} & -\frac{\lambda^2 + u^2}{z} & v \\ 0 & -\frac{\lambda}{z} & \frac{v}{z} & \frac{\lambda^2 + v^2}{z} & -\frac{uv}{\lambda} & -u \\ 0 & 0 & 0 & 0 & 0 & -1 \end{bmatrix} V,$$

where λ is a focus of a camera, u,v are separately horizontal coordinates and vertical coordinates of a target point in the image, z is a depth value of the target point in a coordinate system of the camera, $J_1$ is the image Jacobian matrix, $V=[v_x, v_y, v_z, \omega_x, \omega_y, \omega_z]^T$, V is an apparatus velocity, and $v_x$, $v_y$, $v_z$, $\omega_x$, $\omega_y$, $\omega_z$ are separately linear velocities and angular velocities along an x axis, a y axis, and a Z axis.

Optionally, the determining a position vector of an intersection point of the ith sensor and a measured plane in an apparatus coordinate system specifically includes:

$$p_{h_1}^Z = \begin{bmatrix} \frac{\sqrt{3}}{3}d \\ 0 \\ h_1 \end{bmatrix}, p_{h_2}^Z = R_z\left(\frac{2}{3}\pi\right)p_{h_1}^Z, \text{ and } p_{h_3}^Z = R_z\left(-\frac{2}{3}\pi\right)p_{h_1}^Z,$$

where $P_{h_1}^z$ is a position vector of an intersection point of the first sensor and the measured plane in the apparatus coordinate system, $P_{h_2}^z$ is a position vector of an intersection point of the second sensor and the measured plane in the apparatus coordinate system, $P_{h_3}^z$ is a position vector of an intersection point of the third sensor and the measured plane in the apparatus coordinate system, d is a fixed distance between center axes of the three distance measurement sensors, the three sensors are distributed as an equilateral triangle, each distance is d, and $R_z$ is a rotation matrix around a central axis of the camera.

Optionally, the determining a normal vector of the measured plane according to the position vector of the intersection point of the ith sensor and the measured plane in the apparatus coordinate system is specifically expressed as:

$$n^Z = \begin{bmatrix} h_3 - h_1 + h_2 + h_1 \\ \sqrt{3}(h_3 - h_1 + h_2 + h_1) \\ \sqrt{3}d \end{bmatrix} = \begin{bmatrix} h_3 + h_2 - 2h_1 \\ \sqrt{3}(h_3 - h_2) \\ \sqrt{3}d \end{bmatrix}.$$

Optionally, the determining the depth Jacobian matrix according to the normal vector is specifically expressed as:

$$\begin{bmatrix} \dot{h}_1 \\ \dot{h}_2 \\ \dot{h}_3 \end{bmatrix} = J_2 V = \begin{bmatrix} -\frac{\sqrt{3}}{3d}(n^Z)^T & -\frac{\sqrt{3}}{3d}(p_{h_1}^z)^T S(n^Z) \\ -\frac{\sqrt{3}}{3d}(n^Z)^T & -\frac{\sqrt{3}}{3d}(p_{h_2}^z)^T S(n^Z) \\ -\frac{\sqrt{3}}{3d}(n^Z)^T & -\frac{\sqrt{3}}{3d}(p_{h_3}^z)^T S(n^Z) \end{bmatrix} V,$$

where $S(n^z)$ is antisymmetric matrix of $n^z$.

Optionally, the determining an end velocity of the robot according to the error value is specifically expressed as:

$$V = -KJ^+ e,$$

where $J^+$ is an inverse matrix of a hybrid visual Jacobian matrix, e is an error value, $$e = f_d - f, \begin{cases} \dot{e} = -Ke \\ \dot{e} = JV \end{cases},$$

K is a proportionality coefficient, and V is an end apparatus velocity of the robot.

According to specific embodiments of the present disclosure, the present disclosure has the following technical effects:

Distance information obtained by a distance measurement sensor in the present disclosure compensates for insufficient feedback information of a visual sensor. The distance information and visual information is combined, to achieve full measurement of three-dimensional space, and avoid redundancy during information fusion. In the present disclosure, a hybrid Jacobian matrix formed through space fusion is a 6-dimensional full-rank matrix. A pseudo-inverse solution of a matrix is avoided, problems of a local minimum and singularity in conventional IBVS are resolved, and a system is globally asymptotically stable. In a visual servoing process, the system can track the target point accurately and quickly. In addition, the method provides a new research direction for development of visual servoing control.

BRIEF DESCRIPTION OF DRAWINGS

To describe the techniques described in the embodiments art more clearly, the accompanying drawings illustrating the embodiments will be described briefly below. A person of ordinary skill in the art may still derive other drawings from these accompanying drawings without creative efforts.

DETAILED DESCRIPTION

The following describes various embodiments with reference to accompanying drawings. Additional embodiments obtained by a person of ordinary skill in the art based on the examples in the present application without creative efforts shall fall within the scope of the present application.

The present application discloses a hybrid visual servoing method based on fusion of distance space and image feature space, to resolve problems of multi-information fusion and information redundancy, so that a robot can perceive an environment change comprehensively, realize precise positioning of a target object, and complete a servoing task.

The various embodiments are further described in detail below with reference to the accompanying drawings and specific implementations.

Figure 2:
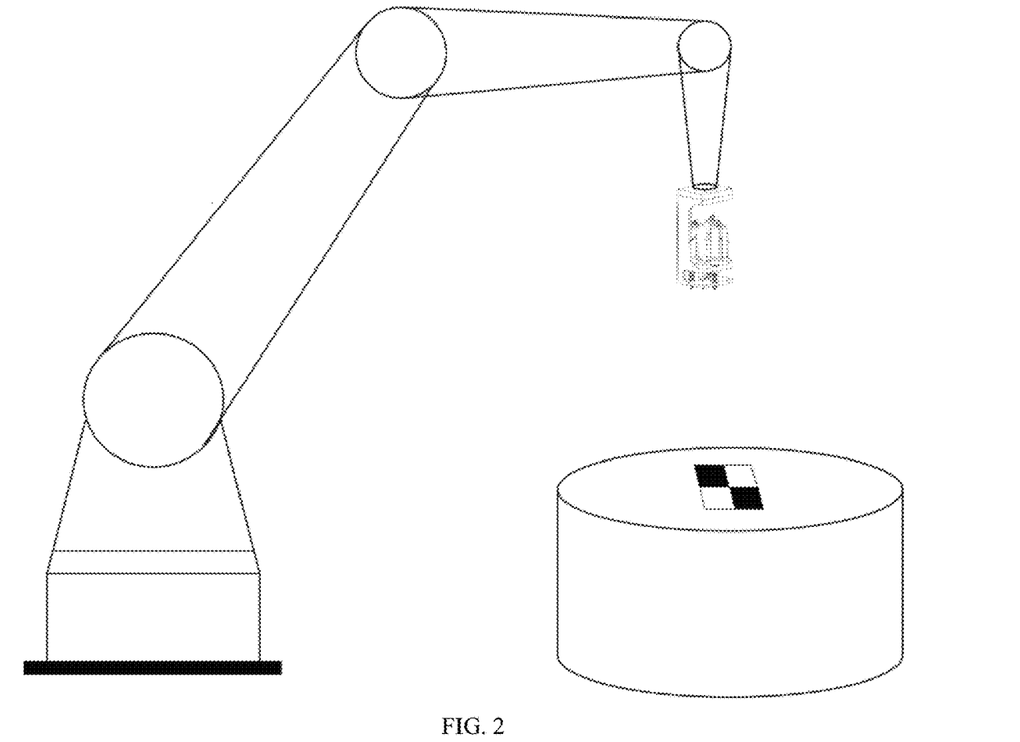
FIG. 2 is a plan view of a robot, an apparatus, and a target object according to an embodiment disclosed herein.

FIG. 2 is a plan view of a robot, an apparatus, and a target object according to an embodiment of the present disclosure. Specifically, FIG. 2 shows the installation relationship between the apparatus and the robot and the spatial pose of the target object relative to the robot.

Figure 3:
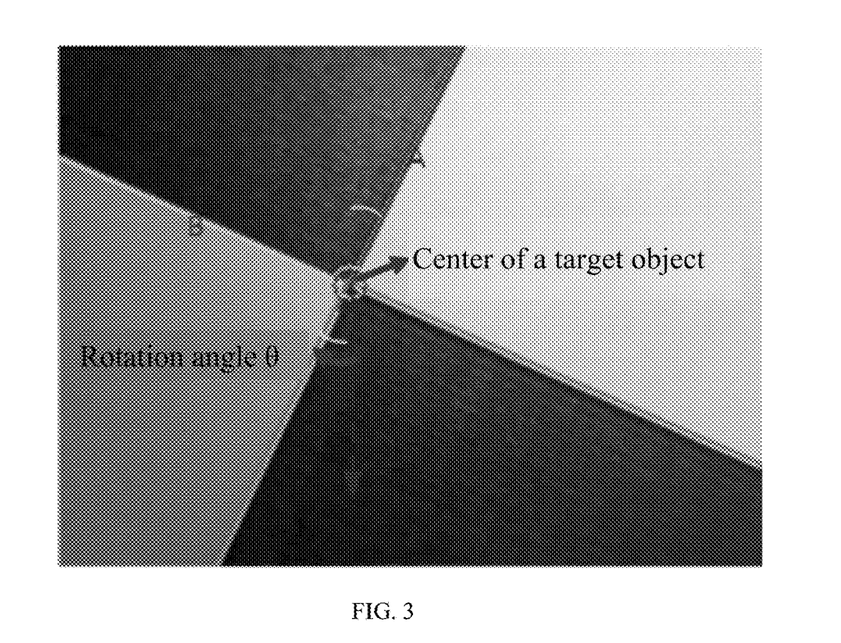
FIG. 3 is a schematic diagram of image feature space information according to an embodiment disclosed herein.
Figure 4A:
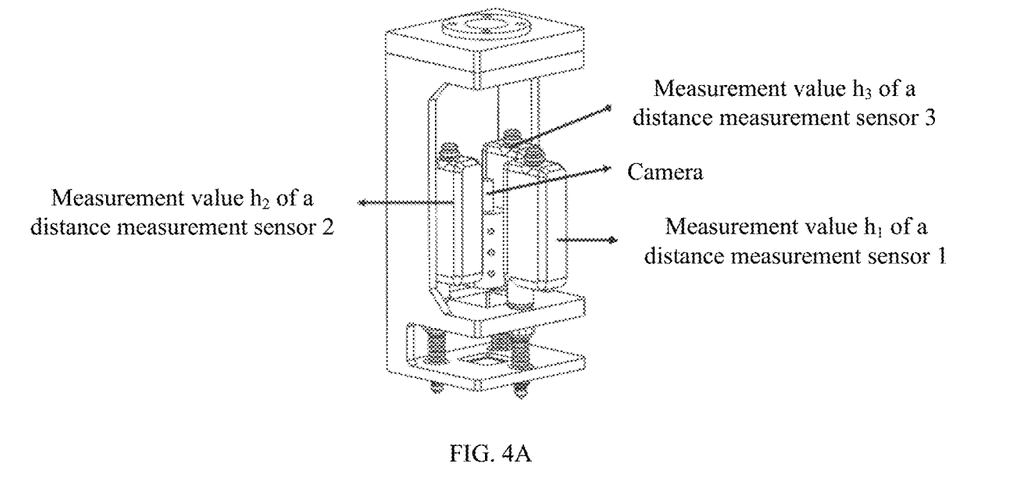
FIG. 4A is a schematic diagram of sensor installation according to an embodiment disclosed herein.
Figure 4B:
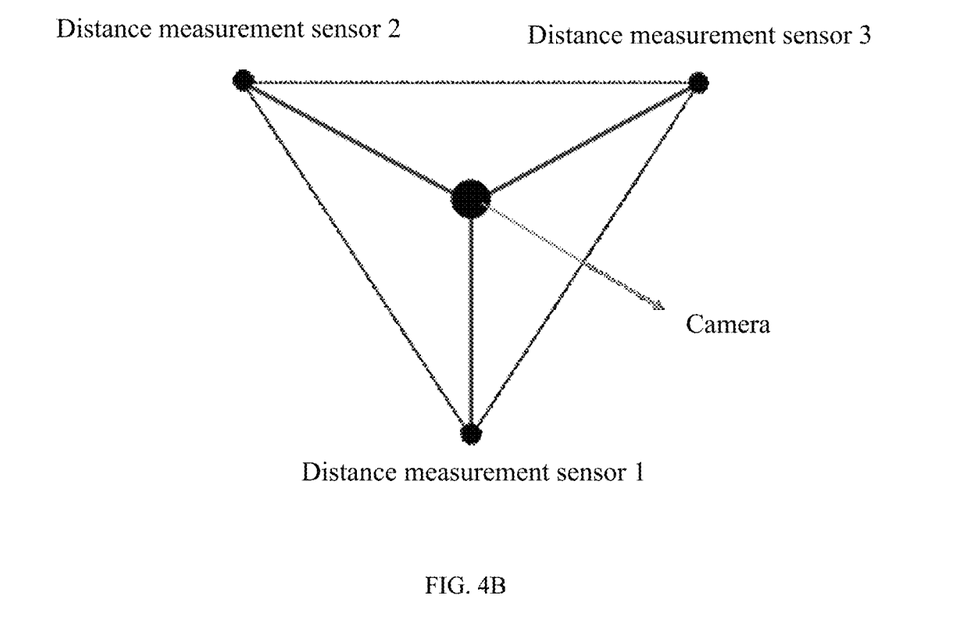
FIG. 4B is another schematic diagram of sensor installation according to an embodiment disclosed herein.

In some embodiments, a target center (u, v, θ) is first obtained by using a visual sensor and a related image processing algorithm. Herein, (u,v) represents image coordinates of a center of the target object, and θ represents a deflection angle that is of image information between an end of the robot and an object and that is relative to a desired posture, as illustrated in FIG. 3. Distance information ($h_1$, $h_2$, $h_3$) is obtained by using three distance measurement sensors, as illustrated in FIG. 4A and FIG. 4B, and a combination of the visual information and the distance information is used as a feature in visual servoing, to obtain a feature Jacobian matrix (which is used to describe a velocity relationship between a feature and an apparatus fixed at an end of the robot).

In some embodiments, a corresponding control algorithm is designed, to obtain a robot motion control amount, to enable a robot to move to a target position, to complete a precise positioning task.

Figure 1:
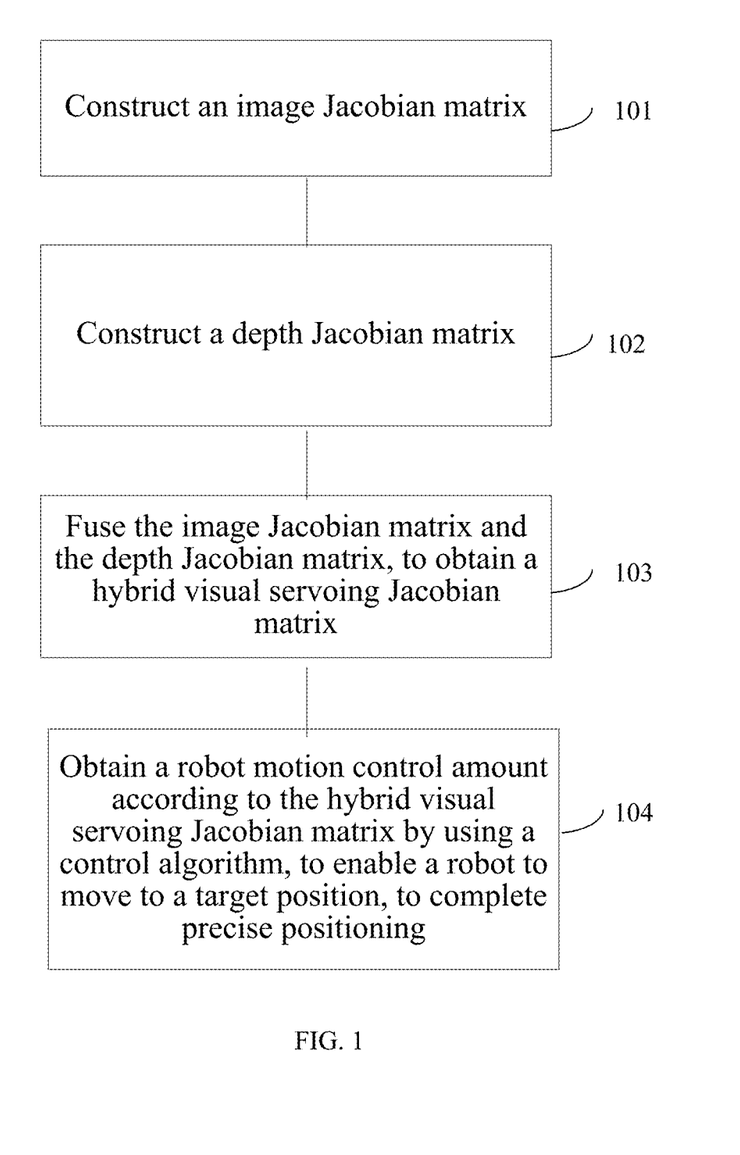
FIG. 1 is a flowchart of a visual servoing method based on fusion of distance space and image feature space according to an embodiment disclosed herein.

FIG. 1 is a flowchart illustrating a visual servoing method based on fusion of distance space and image feature space according to an embodiment of the present disclosure. As shown in FIG. 1, the method includes:

Step 101: Construct an image Jacobian matrix.

In some embodiments, $V=[v_x, v_y, v_z, \omega_x, \omega_y, \omega_z]^T$ is used to represent an apparatus velocity, and respectively includes linear velocities and angular velocities along an x axis, a y axis, and a Z axis, $f=[u, v, \theta, h_1, h_2, h_3]^T$ is used to represent a system feature, and respectively includes horizontal coordinates and vertical coordinates of a target object in an image, a deflection angle that is between an end of the robot and the object and that is relative to a desired posture, and distance measurement values of three distance measurement sensors, and $f_d=[u_d, v_d, \theta_d, h_{1d}, h_{2d}, h_{3d}]^T$ is used to represent a desired system feature.

First, the image is obtained by using a common RGB industrial camera integrating an end apparatus.

The target image is converted into a grayscale image, and binarization processing is performed, to obtain a binary image.

Mean filtering is performed on the binary image, to remove a noise point from the image, and edge detection is performed on the filtered binary image by using a Canny algorithm or other edge detection algorithms known to someone skilled in the art, to obtain an edge-detected image.

Figure 5:
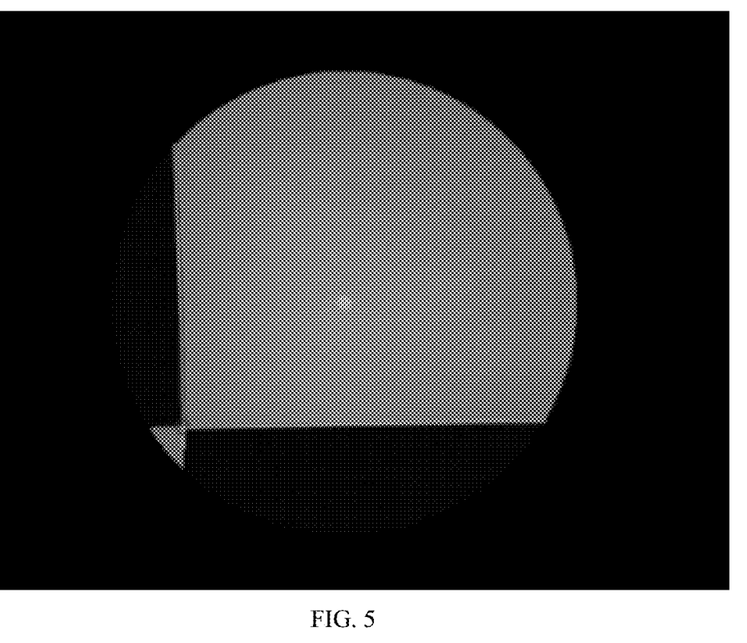
FIG. 5 is a schematic diagram of a field of view of a camera according to an embodiment disclosed herein.
Figure 6:
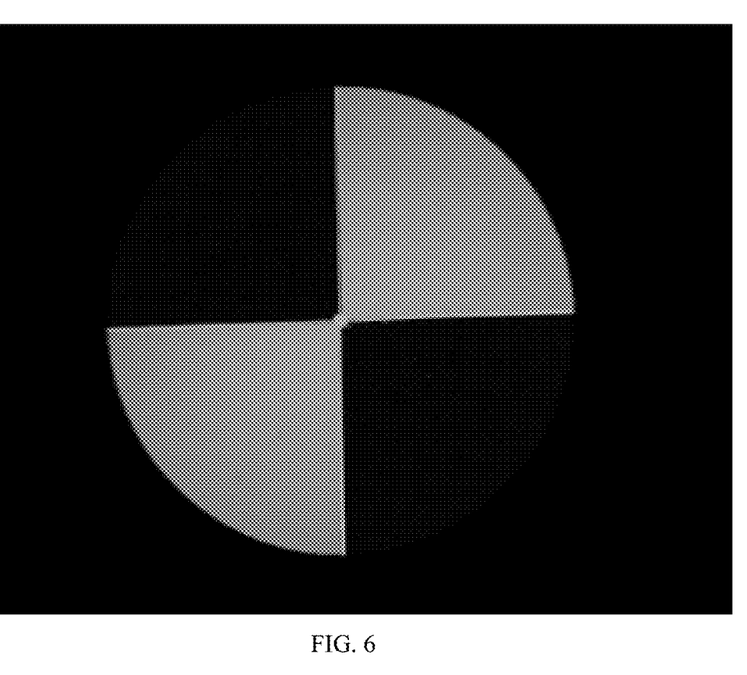
FIG. 6 is a diagram of a visual servoing result according to an embodiment disclosed herein.

The edge-detected image is detected by using a Hough line detection algorithm or other line detection methods known to someone skilled in the art. During detection, different quantities of straight lines are obtained according to different straight-line lengths and confidence level parameters. The parameters (a straight-line length and a confidence level) are adjusted according to an actual length of the target object. In addition, two longest straight lines that are intersected can be obtained according to a condition that two straight lines are intersected. The straight lines are drawn on an original image, as shown in FIG. 5 and FIG. 6.

The two straight lines obtained in the previous step are given by using coordinates of start points and coordinates of end points of the straight lines. It is assumed that the two straight lines that are intersected are A and B, two coordinate points of the straight line A are $(a_x,a_y),(b_x,b_y)$ and coordinate points of the straight line B are $(c_x, c_d),(d_x,d_y)$. Therefore, an intersection point of the two straight lines may be represented as O(u,v):

$$u=(a_x+a_0 \cdot r_{11}+c_x+a_1 \cdot r_{21})/2$$

$$v=(a_y+a_0 \cdot r_{12}+c_y+a_1 \cdot r_{22})/2$$

Herein $r_{11}=b_x-a_x$, $r_{12}=b_y-a_y$, $r_{21}=c_x-d_x$, $r_{22}=c_y-d_y$, and $$\begin{bmatrix} a_0 \\ a_1 \end{bmatrix} = \begin{bmatrix} b_x - a_x & -(c_x - d_x) \\ b_y - a_y & -(c_y - d_y) \end{bmatrix}^{-1} \begin{bmatrix} c_x - a_x \\ c_y - a_y \end{bmatrix}.$$

The deflection angle of the end of the robot relative to the desired posture of target object is determined according to the intersection point and a point on one straight line. The deflection angle is represented by θ:

$$\theta = a\tan\left(\frac{a_x - u}{a_y - v}\right).$$

The image Jacobian matrix is determined according to the intersection point and the deflection angle.

The intersection point (u,v) of image features is image coordinates (u,v) of a target center, and an included angle θ is the deflection angle that is between the end and the object and that is relative to the desired posture. Further, an image Jacobian matrix $J_1$ used to describe a camera velocity and a feature change velocity $(\dot{u}, \dot{v}, \dot{\theta})$ is obtained according to a known quantity:

$$\begin{bmatrix} \dot{u} \\ \dot{v} \\ \dot{\theta} \end{bmatrix} = J_1 V = \begin{bmatrix} -\frac{\lambda}{z} & 0 & \frac{u}{z} & \frac{uv}{\lambda} & -\frac{\lambda^2 + v^2}{\lambda} & v \\ 0 & -\frac{\lambda}{z} & \frac{v}{z} & \frac{\lambda^2 + v^2}{\lambda} & -\frac{uv}{\lambda} & -u \\ 0 & 0 & 0 & 0 & 0 & -1 \end{bmatrix} V.$$

Herein, λ is a focus of a camera, u, v are separately horizontal coordinates and vertical coordinates of a target point in the image, z is a depth value of the target point in a coordinate system of the camera, $V=[v_x, v_y, v_z, \omega_x, \omega_y, \omega_z]^T$, V is an apparatus velocity, and $v_x, v_y, v_z, \omega_x, \omega_y, \omega_z$ are separately linear velocities and angular velocities along an x axis, a y axis, and a Z axis.

Step 102: Construct a depth Jacobian matrix.

In some embodiments, the distance measurement sensors are assembled as shown in FIG. 4A. The three distance measurement sensors are installed in an equilateral triangle by using an axial direction of a visual sensor as a central axis, and distances between axial directions of the three distance measurement sensors have fixed values and are equal. The three distance measurement sensors are configured to: collect distance information in real time, and calculate the depth Jacobian matrix.

A position vector of an intersection point of the ith sensor and a measured plane in an apparatus coordinate system is determined:

$$p_{h_1}^Z = \begin{bmatrix} \frac{\sqrt{3}}{3}d \\ 0 \\ h_1 \end{bmatrix}, \; p_{h_2}^Z = R_z\left(\frac{2}{3}\pi\right)p_{h_1}^Z, \text{ and } p_{h_3}^Z = R_z\left(-\frac{2}{3}\pi\right)p_{h_1}^Z.$$

Herein, $P_{h_1}^z$ is a position vector of an intersection point of the first sensor and the measured plane in the apparatus coordinate system, $P_{h_2}^z$ is a position vector of an intersection point of the second sensor and the measured plane in the apparatus coordinate system, $P_{h_3}^z$ is a position vector of an intersection point of the third sensor and the measured plane in the apparatus coordinate system, d is a fixed distance between center axes of the three distance measurement sensors, the three sensors are distributed as an equilateral triangle, each distance is d, and $R_z$ is a rotation matrix around a central axis of the camera.

A normal vector of the measured plane is determined according to the position vector of the intersection point of the ith sensor and the measured plane in the apparatus coordinate system:

$$n^Z = \begin{bmatrix} h_3 - h_1 + h_2 + h_1 \\ \sqrt{3}(h_3 - h_1 + h_2 + h_1) \\ \sqrt{3}d \end{bmatrix} = \begin{bmatrix} h_3 + h_2 - 2h_1 \\ \sqrt{3}(h_3 - h_2) \\ \sqrt{3}d \end{bmatrix}$$

Therefore, a Jacobian matrix $J_2$ between a depth measurement value $h_i$ (i=1, 2, 3) and an apparatus velocity is obtained.

$$\begin{bmatrix} \dot{h}_1 \\ \dot{h}_2 \\ \dot{h}_3 \end{bmatrix} = J_2 V = \begin{bmatrix} -\frac{\sqrt{3}}{3d}(n^Z)^T & -\frac{\sqrt{3}}{3d}(p_{h_1}^Z)^T S(n^Z) \\ -\frac{\sqrt{3}}{3d}(n^Z)^T & -\frac{\sqrt{3}}{3d}(p_{h_2}^Z)^T S(n^Z) \\ -\frac{\sqrt{3}}{3d}(n^Z)^T & -\frac{\sqrt{3}}{3d}(p_{h_3}^Z)^T S(n^Z) \end{bmatrix} V.$$

Herein, $S(n^z)$ is an antisymmetric array of $n^z$.

It is assumed that $n^z = [n1, n2, n3]^T$. Herein, the antisymmetric array of $n^z$ is $$S(n^Z) = \begin{bmatrix} 0 & -n3 & n2 \\ n3 & 0 & -n1 \\ -n2 & n1 & 0 \end{bmatrix}.$$

Step 103: Fuse the image Jacobian matrix and the depth Jacobian matrix, to obtain a hybrid visual servoing Jacobian matrix.

$$\dot{f} = \begin{bmatrix} \dot{u} \\ \dot{v} \\ \dot{\theta} \\ \dot{h}_1 \\ \dot{h}_2 \\ \dot{h}_3 \end{bmatrix} = \begin{bmatrix} J_1 \\ J_2 \end{bmatrix} V = \begin{bmatrix} -\frac{\lambda}{z} & 0 & \frac{u}{z} & \frac{uv}{\lambda} & -\frac{\lambda^2+v^2}{\lambda} \\ 0 & -\frac{\lambda}{z} & \frac{v}{z} & \frac{\lambda^2+v^2}{\lambda} & -\frac{uv}{\lambda} & -u \\ 0 & 0 & 0 & 0 & 0 & -1 \\ -\frac{\sqrt{3}}{3d}(n^Z)^T & -\frac{\sqrt{3}}{3d}(p_{h_1}^Z)^T S(n^Z) \\ -\frac{\sqrt{3}}{3d}(n^Z)^T & -\frac{\sqrt{3}}{3d}(p_{h_2}^Z)^T S(n^Z) \\ -\frac{\sqrt{3}}{3d}(n^Z)^T & -\frac{\sqrt{3}}{3d}(p_{h_3}^Z)^T S(n^Z) \end{bmatrix} V$$

It can be learned, through analysis, that the Jacobian matrix is a 6-dimensional full-rank matrix, and meets $JJ^+>0$. Therefore, a system is globally asymptotically stable.

Step 104: Obtain a robot motion control amount according to the hybrid visual servoing Jacobian matrix by using a control algorithm, to enable a robot to move to a target position, to complete precise positioning.

In some embodiments, the corresponding control algorithm is designed, and the Jacobian matrix is combined, to provide a velocity control amount of the end apparatus. Herein, $f_d = [u_d, v_d, \theta_d, h_{1d}, h_{2d}, h_{3d}]^T$ represents a desired system feature, and is a measurement value of each feature when the system reaches the target position.

An error value $e = f_d - f$ of a visual servoing system is determined. It is assumed that $$\begin{cases} \dot{e} = -Ke \\ \dot{e} = JV \end{cases},$$

K is a proportional coefficient, and V is a velocity of an end apparatus of the robot, that is, an end velocity of the robot.

The end velocity of the robot is determined according to the error value:

$$V = -KJ^+ e,$$

where $J^+$ is an inverse matrix of a hybrid visual Jacobian matrix, and e is an error value.

The robot is enabled to move to the target position according to the end velocity of the robot, to complete precise positioning:

After the end velocity V of the robot is obtained, the end velocity is directly sent to the robot, so that the robot moves. In addition, when the robot reaches the target position, 0 is obtained according to $e = f_d - f$. Therefore, the calculated V is 0. In this case, the robot stops moving. That is, after the robot moves to the target position, the robot stops moving, to complete a precise positioning task.

According to the 6-dimensional full-rank Jacobian matrix in the hybrid visual servoing method in the present disclosure, problems such as singularity and a local minimum of a conventional Jacobian matrix are avoided. Complementary image feature space and distance space are fused. A deficiency in visual information is compensated for without redundant information. A system collects data in real time, and can quickly complete a visual servoing task according to a simple control algorithm.

Each embodiment of this specification is described in an incremental manner. Each embodiment focuses on the difference from other embodiments. Certain portions of one embodiment could be combined with or could replace other portions of another embodiment when applicable.

In this specification, specific examples are used to describe the principles and implementations of the embodiments. The description of the foregoing embodiments is used to help understand the method of the present disclosure and related techniques. In addition, a person of ordinary skill in the art can make various modifications in terms of specific implementations and scope of application in accordance with the ideas of the present disclosure. In conclusion, the content of this specification shall not be construed as a limitation to the present disclosure.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
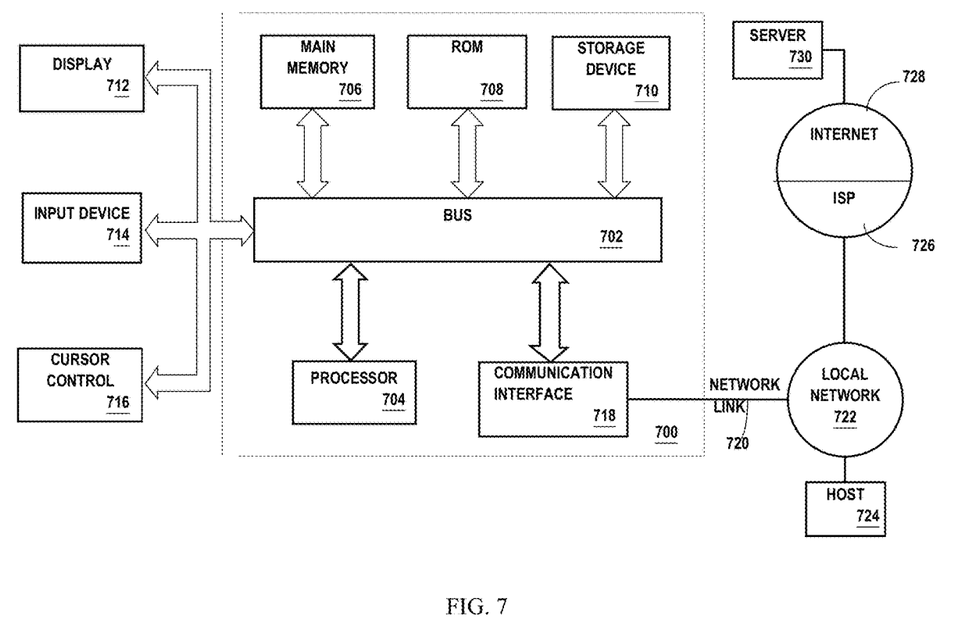
FIG. 7 is a block diagram that illustrates a computer system upon which an embodiment of the approach may be implemented.

For example, FIG. 7 is a block diagram that illustrates a computer system 700 upon which an embodiment of the approach may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A visual servoing method based on fusion of distance space and image feature space, comprising:
   constructing an image Jacobian matrix;
   constructing a depth Jacobian matrix;
   fusing the image Jacobian matrix and the depth Jacobian matrix, to obtain a hybrid visual servoing Jacobian matrix;
   obtaining a robot motion control amount according to the hybrid visual servoing Jacobian matrix by using a control algorithm; and
   controlling, in accordance with the obtained robot motion control amount, a robot to move to a target position, to complete precise positioning;
   wherein constructing the image Jacobian matrix comprises:
      obtaining a target image;
      converting the target image into a grayscale image, and performing binarization processing, to obtain a binary image;
      performing mean filtering on the binary image, and performing edge detection on the filtered binary image, to obtain an edge-detected image;
      detecting the edge-detected image by using a Hough line detection algorithm, to obtain two longest straight lines that are intersected; and restoring the two straight lines to the target image, to obtain an intersection point of the two straight lines, wherein two coordinate points of one straight line are $(a_x, a_y)$, $(b_x, b_y)$, two coordinate points of the other straight line are $(c_x, c_y)$, $(d_x, d_y)$, and the intersection point is represented by $O(u, v)$;
      determining a deflection angle of an end of the robot relative to a desired posture of a target object according to the intersection point and a point on one straight line, wherein the deflection angle is represented by $\theta$; and
      determining the image Jacobian matrix according to the intersection point and the deflection angle.

2. The visual servoing method based on fusion of distance space and image feature space according to claim 1, wherein the constructing a depth Jacobian matrix specifically comprises:

determining a position vector of an intersection point of an ith sensor and a measured plane in an apparatus coordinate system;
determining a normal vector of the measured plane according to the position vector of the intersection point of the ith sensor and the measured plane in the apparatus coordinate system; and
determining the depth Jacobian matrix according to the normal vector.

3. The visual servoing method based on fusion of distance space and image feature space according to claim 2, wherein the determining a position vector of an intersection point of the ith sensor and a measured plane in an apparatus coordinate system specifically comprises:

$$p_{h_1}^Z = \begin{bmatrix} \frac{\sqrt{3}}{3}d \\ 0 \\ h_1 \end{bmatrix}, p_{h_2}^Z = R_z\left(\frac{2}{3}\pi\right)p_{h_1}^Z, \text{ and } p_{h_3}^Z = R_z\left(-\frac{2}{3}\pi\right)p_{h_1}^Z,$$

wherein $P_{h_1}^z$ is a position vector of an intersection point of a first sensor and the measured plane in the apparatus coordinate system, $P_{h_2}^z$ is a position vector of an intersection point of a second sensor and the measured plane in the apparatus coordinate system, $P_{h_3}^z$ is a position vector of an intersection point of a third sensor and the measured plane in the apparatus coordinate system, d is a fixed distance between center axes of the three distance measurement sensors, the three sensors are distributed as an equilateral triangle, each distance is d, and $R_z$ is a rotation matrix around a central axis of the camera.

4. The visual servoing method based on fusion of distance space and image feature space according to claim 2, wherein the determining a normal vector of the measured plane according to the position vector of the intersection point of the ith sensor and the measured plane in the apparatus coordinate system is specifically expressed as:

$$n^Z = \begin{bmatrix} h_3 - h_1 + h_2 - h_1 \\ \sqrt{3}(h_3 - h_1 + h_2 + h_1) \\ \sqrt{3}d \end{bmatrix} = \begin{bmatrix} h_3 + h_2 - 2h_1 \\ \sqrt{3}(h_3 - h_2) \\ \sqrt{3}d \end{bmatrix},$$

wherein $n^z$ is the normal vector of the measured plane, $h_1$ is a depth measurement value of a first sensor, $h_2$ is a depth measurement value of a second sensor, $h_3$ is a depth measurement value of a third sensor, and d is a fixed distance between center axes of three distance measurement sensors.

5. The visual servoing method based on fusion of distance space and image feature space according to claim 2, wherein the determining the depth Jacobian matrix according to the normal vector is specifically expressed as:

$$\begin{bmatrix} \dot{h}_1 \\ \dot{h}_2 \\ \dot{h}_3 \end{bmatrix} = J_2 V = \begin{bmatrix} -\frac{\sqrt{3}}{3d}(n^Z)^T & -\frac{\sqrt{3}}{3d}(p_{h_1}^Z)^T S(n^Z) \\ -\frac{\sqrt{3}}{3d}(n^Z)^T & -\frac{\sqrt{3}}{3d}(p_{h_2}^Z)^T S(n^Z) \\ -\frac{\sqrt{3}}{3d}(n^Z)^T & -\frac{\sqrt{3}}{3d}(p_{h_3}^Z)^T S(n^Z) \end{bmatrix} V,$$

wherein $h_1$ is a depth measurement value of a first sensor, $h_2$ is a depth measurement value of a second sensor, $h_3$ is a depth measurement value of a third sensor, $J_2$ is a depth Jacobian matrix, V is an apparatus velocity, $n^z$ is the normal vector of the measured plane, and $S(n^z)$ is antisymmetric matrix of $n^z$.

6. The visual servoing method based on fusion of distance space and image feature space according to claim 1, wherein the obtaining a robot motion control amount according to the hybrid visual servoing Jacobian matrix by using a control algorithm, to enable a robot to move to a target position, to complete precise positioning specifically comprises:
   determining an error value of a visual servoing system;
   determining an end velocity of the robot according to the error value; and
   enabling the robot to move to the target position according to the end velocity of the robot, to complete precise positioning.

7. The visual servoing method based on fusion of distance space and image feature space according to claim 6, wherein the determining an end velocity of the robot according to the error value is specifically expressed as:

$$V = -KJ^+e,$$

wherein $J^+$ is an inverse matrix of a hybrid visual Jacobian matrix, e is an error value, $e = f_d - f$, $$\begin{cases} \dot{e} = -Ke \\ \dot{e} = JV \end{cases},$$

K is a proportionality coefficient, and V is an end apparatus velocity of the robot.

8. The visual servoing method based on fusion of distance space and image feature space according to claim 1, wherein the determining a deflection angle of an end of the robot relative to the desired posture of target object according to the intersection point and a point on one straight line is specifically expressed as:

$$\theta = a\tan\left(\frac{a_x - u}{a_y - v}\right).$$

9. The visual servoing method based on fusion of distance space and image feature space according to claim 1, wherein the determining the image Jacobian matrix according to the intersection point and the deflection angle is specifically expressed as:

$$\begin{bmatrix} \dot{u} \\ \dot{v} \\ \dot{\theta} \end{bmatrix} = J_1 V = \begin{bmatrix} -\frac{\lambda}{z} & 0 & \frac{u}{z} & \frac{uv}{\lambda} & -\frac{\lambda^2 + u^2}{\lambda} & v \\ 0 & -\frac{\lambda}{z} & \frac{v}{z} & \frac{\lambda^2 + v^2}{\lambda} & -\frac{uv}{\lambda} & -u \\ 0 & 0 & 0 & 0 & 0 & -1 \end{bmatrix} V,$$

wherein $\lambda$ is a focus of a camera, u,v are separately horizontal coordinates and vertical coordinates of a target point in the image, z is a depth value of the target point in a coordinate system of the camera, $J_1$ is the image Jacobian matrix, $V = [v_x, v_y, v_z, \omega_x, \omega_y, \omega_z]^T$, V is an apparatus velocity, and $v_x$, $v_y$, $v_z$, $\omega_x$, $\omega_y$, $\omega_z$ are separately linear velocities and angular velocities along an x axis, a y axis, and a Z axis.

* * * * *